United States Patent
Tanaka et al.

(10) Patent No.: US 10,996,594 B1
(45) Date of Patent: May 4, 2021

(54) ENDLESS BELT, TRANSFER DEVICE, AND IMAGE FORMING APPARATUS

(71) Applicant: FUJI XEROX CO., LTD., Tokyo (JP)

(72) Inventors: Hiroaki Tanaka, Kanagawa (JP); Satoya Sugiura, Kanagawa (JP); Daisuke Tanemura, Kanagawa (JP); Masato Ono, Kanagawa (JP); Masato Furukawa, Kanagawa (JP); Shigeru Fukuda, Kanagawa (JP); Masayuki Seko, Kanagawa (JP); Koichi Matsumoto, Kanagawa (JP); Shogo Hayashi, Kanagawa (JP); Tomoko Suzuki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/858,027

(22) Filed: Apr. 24, 2020

(30) Foreign Application Priority Data

Dec. 6, 2019 (JP) .............................. JP2019-221327

(51) Int. Cl.
*G03G 15/16* (2006.01)
*C08L 79/08* (2006.01)
*G03G 9/08* (2006.01)
*B65G 15/32* (2006.01)

(52) U.S. Cl.
CPC ........... *G03G 15/162* (2013.01); *B65G 15/32* (2013.01); *C08L 79/08* (2013.01); *G03G 9/08* (2013.01); *B65G 2207/10* (2013.01); *G03G 2215/1623* (2013.01)

(58) Field of Classification Search
CPC ..... B65G 2207/10; B65G 15/32; B65G 15/34; C08L 79/08; G03G 9/08; G03G 15/162; G03G 15/164; G03G 15/1685; G03G 5/153
USPC ................................................ 198/844.1, 846
See application file for complete search history.

(56) References Cited

U.S. PATENT DOCUMENTS

| 7,950,213 B2 * | 5/2011 | Bigler | F16G 1/22 59/84 |
| 2010/0236897 A1 * | 9/2010 | Chiang | C08L 83/04 198/782 |
| 2012/0195656 A1 * | 8/2012 | Saegusa | C08L 33/14 399/333 |
| 2013/0334014 A1 * | 12/2013 | Mashiko | B65G 15/32 198/847 |
| 2014/0001014 A1 * | 1/2014 | Shoji | B65G 15/54 198/846 |

(Continued)

FOREIGN PATENT DOCUMENTS

| JP | 2007-11117 A | 1/2007 |
| JP | 2007-78789 A | 3/2007 |

*Primary Examiner* — James R Bidwell
(74) *Attorney, Agent, or Firm* — Sughrue Mion, PLLC

(57) ABSTRACT

An endless belt includes either a single-layer body including a layer including an imide resin and conductive particles, or a multilayer body including the layer as an outermost layer. The ratio y/x of the layer is 0.8992 or more and 1.0157 or less, where x [log Ω/□] is the common logarithm of the surface resistivity of the outer peripheral surface of the layer measured with a ring probe when a voltage of 100 V is applied to the layer for 3 seconds at a load of 1 kg, and y [log Ω·cm] is the common logarithm of the volume resistivity of the layer measured with a ring probe when a voltage of 100 V is applied to the layer for 5 seconds at a load of 1 kg.

20 Claims, 1 Drawing Sheet

(56) References Cited

U.S. PATENT DOCUMENTS

| | | | | |
|---|---|---|---|---|
| 2015/0030845 A1* | 1/2015 | Carney | ............... | C08K 3/36 |
| | | | | 428/329 |
| 2015/0286164 A1* | 10/2015 | Katagiri | ............ | G03G 15/16 |
| | | | | 399/66 |
| 2018/0157195 A1* | 6/2018 | Iida | ............... | G03G 15/1605 |
| 2019/0271937 A1* | 9/2019 | Komatsu | ............ | G03G 15/16 |
| 2019/0278207 A1* | 9/2019 | Fukuda | ............ | B32B 27/285 |

* cited by examiner

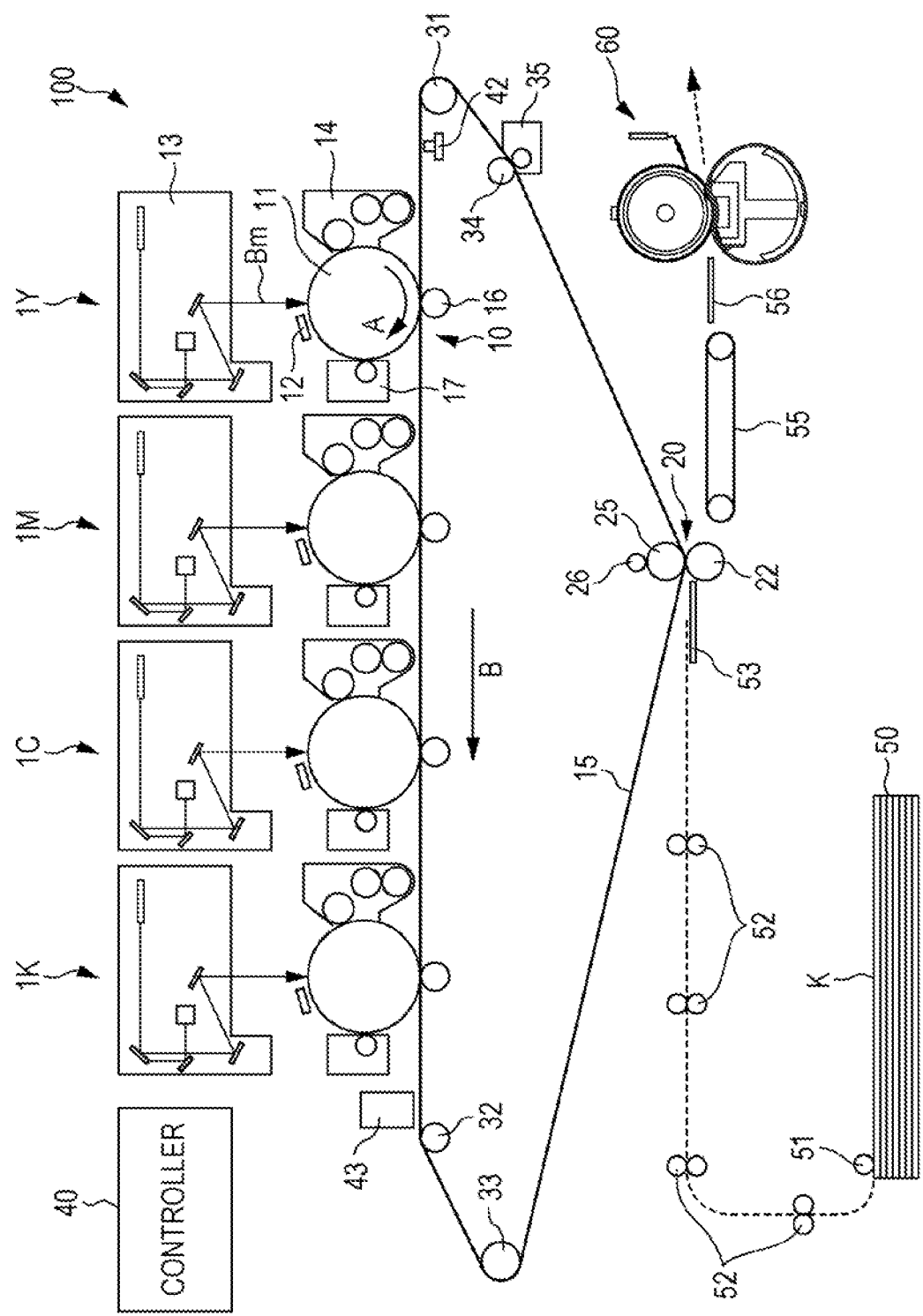

ENDLESS BELT, TRANSFER DEVICE, AND IMAGE FORMING APPARATUS

CROSS-REFERENCE TO RELATED APPLICATIONS

This application is based on and claims priority under 35 USC 119 from Japanese Patent Application No. 2019-221327 filed Dec. 6, 2019.

BACKGROUND

(i) Technical Field

The present disclosure relates to an endless belt, a transfer device, and an image forming apparatus.

(ii) Related Art

Electrophotographic image forming apparatuses (e.g., a copying machine, a facsimile, and a printer) form an image by transferring a toner image formed on the surface of an image holding member onto the surface of a recording medium and fixing the toner image to the recording medium. When a toner image is transferred to a recording medium, for example, an electrically conductive endless belt, such as an intermediate transfer belt, is used.

For example, Japanese Laid Open Patent Application Publication No. 2007-011117 discloses an intermediate transfer belt that includes a substrate and at least a surface layer disposed on the substrate, the surface layer including aggregates of conductive particles having an average size of 0.5 to 25 μm.

Japanese Laid Open Patent Application Publication No. 2007-078789 discloses an intermediate transfer belt that includes a substrate and at least a surface layer disposed on the substrate, the surface layer including resin microparticles coated with a metal.

SUMMARY

In the case where a recording medium having large surface irregularities (hereinafter, such a recording medium is referred to as "rough surface paper"), such as embossed paper, is used in an image forming apparatus that includes an endless belt as an intermediate transfer body, the intermediate transfer body may fail to follow the rough surface of the recording medium when a toner image is transferred from the intermediate transfer body to the recording medium. This reduces transferability and may cause white missing dots to be formed in an image.

Aspects of non-limiting embodiments of the present disclosure relate to an endless belt that may enhance the transferability to rough surface paper when used as an intermediate transfer body, compared with an endless belt that is either a single-layer body consisting of a layer including an imide resin and conductive particles and having a y/x ratio of less than 0.8992 or more than 1.0157 or a multilayer body including the layer as an outermost layer.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an endless belt including either a single-layer body consisting of a layer including an imide resin and conductive particles, or a multilayer body including the layer as an outermost layer. A ratio y/x of the layer is 0.8992 or more and 1.0157 or less, where x [log Ω/□] is a common logarithm of a surface resistivity of an outer peripheral surface of the layer, the surface resistivity being measured with a ring probe when a voltage of 100 V is applied to the layer for 3 seconds at a load of 1 kg, and y [log Ω·cm] is a common logarithm of a volume resistivity of the layer, the volume resistivity being measured with a ring probe when a voltage of 100 V is applied to the layer for 5 seconds at a load of 1 kg.

BRIEF DESCRIPTION OF THE DRAWING

An exemplary embodiment of the present disclosure will be described in detail based on the following FIGURE, wherein:

FIGURE is a schematic diagram illustrating an example of an image forming apparatus according to an exemplary embodiment.

DETAILED DESCRIPTION

An exemplary embodiment is described below. The following description and Examples below are intended to be illustrative of the exemplary embodiment and not restrictive of the scope of the exemplary embodiment.

In the exemplary embodiment, when numerical ranges are described in a stepwise manner, the upper or lower limit of a numerical range may be replaced with the upper or lower limit of another numerical range, respectively. In the exemplary embodiment, the upper and lower limits of a numerical range may be replaced with the upper and lower limits described in Examples below.

The term "step" used herein refers not only to an individual step but also to a step that is not distinguishable from other steps but achieves the intended purpose of the step.

In the exemplary embodiment, when an exemplary embodiment is described with reference to a drawing, the structure of the exemplary embodiment is not limited to the structure illustrated in the drawing. The sizes of the members illustrated in the attached drawing are conceptual and do not limit the relative relationship among the sizes of the members.

Each of the components described in the exemplary embodiment may include plural types of substances that correspond to the component. In the exemplary embodiment, in the case where a composition includes plural substances that correspond to a component of the composition, the content of the component in the composition is the total content of the plural substances in the composition unless otherwise specified.

Endless Belt

An endless belt according to an exemplary embodiment includes either a single-layer body consisting of a layer including an imide resin and conductive particles, or a multilayer body including the layer as an outermost layer. The ratio y/x of the layer is 0.8992 or more and 1.0157 or less, where x [log Ω/□] is the common logarithm of the surface resistivity of the outer peripheral surface of the layer measured with a ring probe when a voltage of 100 V is applied to the layer for 3 seconds at a load of 1 kg, and y [log Ω·cm] is the common logarithm of the volume resistivity of the layer measured with a ring probe when a voltage of 100 V is applied to the layer for 5 seconds at a load of 1 kg.

The term "conductive" used herein refers to having a volume resistivity of less than $1 \times 10^{13}$ Ωcm at 20° C.

The common logarithm x of surface resistivity is determined by the following method.

The common logarithm [log Ω/☐] of the surface resistivity of the outer peripheral surface of the endless belt is measured using a micro current meter "R8430A" produced by Advantest Corporation as a resistance meter and a UR probe produced by Mitsubishi Chemical Analytech Co., Ltd. as a probe at the center and both edges of the outer peripheral surface of the endless belt in the width direction for each of 6 positions spaced at regular intervals in the circumferential direction, that is, 18 positions in total, with an applied voltage of 100 V, a voltage application time of 3 seconds, and a pressure of 1 kgf. The average of the surface resistivity values measured is calculated. The above measurement is conducted at 22° C. and 55% RH.

The common logarithm y of volume resistivity is determined by the following method.

The common logarithm [log Ω·cm] of the volume resistivity of the endless belt is measured using a micro current meter "R8430A" produced by Advantest Corporation as a resistance meter and a UR probe produced by Mitsubishi Chemical Analytech Co., Ltd. as a probe at the center and both edges of the endless belt in the width direction for each of 6 positions spaced at regular intervals in the circumferential direction, that is, 18 positions in total, with an applied voltage of 100 V, a voltage application time of 5 seconds, and a pressure of 1 kgf. The average of the volume resistivity values measured is calculated. The above measurement is conducted at 22° C. and 55% RH.

Since the single layer or the outermost layer includes an imide resin and conductive particles and has a y/x ratio of 0.8992 or more and 1.0157 or less, the endless belt according to the exemplary embodiment may enhance the transferability to rough surface paper when used as an intermediate transfer body. The reasons are not clear but presumably as follows.

In the case where a rough surface paper sheet is used as a recording medium in an image forming apparatus that includes an endless belt as an intermediate transfer body, the intermediate transfer body may fail to follow the rough surface of the recording medium when a toner image is transferred from the intermediate transfer body to the recording medium. This reduces transferability and may cause white missing dots to be formed in an image.

Specifically, for example, in a second transfer region, the electric charge stored in a toner may discharge in the thickness direction of the intermediate transfer body. This results in a reduction in the amount of charge stored in the toner and may degrade transferability particularly in the recesses present in the recording medium. In addition, in the case where the electric field applied during the transfer of a toner image is increased in order to generate a sufficiently high transfer electric field in the recesses present in the recording medium, an excessively high electric field may be applied locally to the protrusions present in the recording medium. This results in occurrence of abnormal discharge. As a result, the amount of charge stored in the toner may be reduced, or the toner may be oppositely charged. This may degrade transferability.

In order to address the above issues, in the exemplary embodiment, the single layer or the outermost layer includes an imide resin and conductive particles and has a y/x ratio of 0.8992 or more and 1.0157 or less. That is, while the layers including an imide resin and conductive particles known in the related art typically have a low volume resistivity compared with the surface resistivity thereof, the single layer or the outermost layer according to the exemplary embodiment has a higher volume resistivity than those known in the related art, while having a low surface resistivity. This may reduce the discharge of the electric charge stored in the toner in the thickness direction of the intermediate transfer body and limit the degradation of transferability, which may occur due to the reduction in the amount of charge stored in the toner, in the second transfer region.

It is considered that the outer peripheral surface of the layer including an imide resin and conductive particles and having a y/x ratio that falls within the above range has a low surface resistivity because the conductive particles are finely dispersed in the outer peripheral surface of the layer and that the layer has a high volume resistivity because the conductive particles are not widely distributed in the thickness direction of the layer. Accordingly, even when the intermediate transfer body fails to follow the rough surface of a recording medium and an excessively high electric field is applied locally to the protrusions present in the rough surface paper, small discharge may occur at each of the conducting points finely dispersed on the outer peripheral surface of the endless belt and, consequently, the current may be dispersed. This may limit the reduction in the amount of charge stored in the toner or the likelihood of the toner becoming oppositely charged due to the abnormal discharge and enhance transferability.

For the above reasons, the endless belt according to the exemplary embodiment may enhance the transferability to rough surface paper when used as an intermediate transfer body since the single layer or the outermost layer includes an imide resin and conductive particles and has a y/x ratio of 0.8992 or more and 1.0157 or less.

The endless belt may be either a single-layer body or a multilayer body.

In the case where the endless belt is a single-layer body, the single-layer body is the layer including an imide resin and conductive particles and having a y/x ratio of 0.8992 or more and 1.0157 or less.

In the case where the endless belt is a multilayer body, the multilayer body includes, for example, a substrate layer and a surface layer disposed on the substrate layer. The surface layer is the outermost layer of the endless belt. The multilayer body may include another layer interposed between the substrate layer and the surface layer.

In the case where the endless belt is the multilayer body including the substrate layer and the surface layer, the surface layer is the layer including an imide resin and conductive particles and having a y/x ratio of 0.8992 or more and 1.0157 or less. The substrate layer is not limited. The substrate layer is, for example, a layer including a resin for the substrate layer and conductive particles for the substrate layer.

Hereinafter, the layer constituting the endless belt that is the single-layer body may be referred to as "single layer"; the surface layer constituting the endless belt that is the multilayer body, which includes an imide resin and conductive particles, may be referred to as "first layer"; the substrate layer constituting the endless belt that is the multilayer body, which includes the resin for the substrate layer and the conductive particles for the substrate layer, may be referred to as "second layer"; the imide resin and the conductive particles included in the single layer or the first layer may be referred to as "first resin" and "first conductive particles", respectively; and the resin for the substrate layer and the conductive particles for the substrate layer which are included in the second layer may be referred to as "second resin" and "second conductive particles", respectively.

Resin

The imide resin that is the first resin included in the single layer or the first layer is a resin having a constitutional unit including an imide linkage. Examples of such a resin include a polyimide (PI) resin and a polyamide imide (PAI) resin. In consideration of mechanical strength and the dispersibility of the first conductive particles, the first resin may include a polyimide resin. The first resin may be either only one type of resin or a mixture of two or more types of resins.

Examples of the second resin included in the second layer include a polyimide (PI) resin, a polyamide imide (PAI) resin, an aromatic polyether ether ketone resin, a polyphenylene sulfide (PPS) resin, a polyether imide (PEI) resin, a polyester resin, a polyamide resin, and a polycarbonate resin.

The second resin may be either only one type of resin or a mixture of two or more types of resins.

In the case where the endless belt includes the first and second layers, the types of the first and second resins may be the same as or different from each other. For example, the first and second resins may be a polyimide resin.

Polyimide Resin

The polyimide resin may be, for example, a polyimide resin produced by imidization of a polyamic acid (i.e., precursor of the polyimide resin) produced by polymerization of a tetracarboxylic dianhydride with a diamine.

Examples of the polyimide resin include a resin including the structural unit represented by General Formula (I) below.

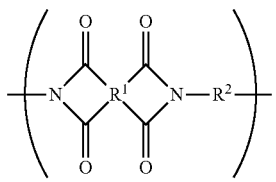

(I)

In General Formula (I), $R^1$ represents a tetravalent organic group, and $R^2$ includes a divalent organic group.

Examples of the tetravalent organic group represented by $R^1$ include an aromatic group, an aliphatic group, a cyclic aliphatic group, a group including an aromatic group and an aliphatic group, and the above groups that include a substituent. Specific examples of the tetravalent organic group include a residue of the tetracarboxylic dianhydride described below.

Examples of the divalent organic group represented by $R^2$ include an aromatic group, an aliphatic group, a cyclic aliphatic group, a group including an aromatic group and an aliphatic group, and the above groups that include a substituent. Specific examples of the divalent organic group include a residue of the diamine described below.

Specific examples of the tetracarboxylic dianhydride used as a raw material for the polyimide resin include pyromellitic dianhydride, 3,3',4,4'-benzophenonetetracarboxylic dianhydride, 3,3',4,4'-biphenyltetracarboxylic dianhydride, 2,3,3',4-biphenyltetracarboxylic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 2,2'-bis(3,4-dicarboxyphenyl)sulfonic dianhydride, perylene-3,4,9,10-tetracarboxylic dianhydride, bis(3,4-dicarboxyphenyl)ether dianhydride, and ethylenetetracarboxylic dianhydride.

Specific examples of the diamine used as a raw material for the polyimide resin include 4,4'-diaminodiphenyl ether, 4,4'-diaminodiphenylmethane, 3,3'-diaminodiphenylmethane, 3,3'-dichlorobenzidine, 4,4'-diaminodiphenyl sulfide, 3,3'-diaminodiphenyl sulfone, 1,5-diaminonaphthalene, m-phenylenediamine, p-phenylenediamine, 3,3'-dimethyl-4,4'-biphenyldiamine, benzidine, 3,3'-dimethylbenzidine, 3,3'-dimethoxybenzidine, 4,4'-diaminodiphenylsulfone, 4,4'-diaminodiphenylpropane, 2,4-bis(β-amino-tert-butyl)toluene, bis(p-β-amino-tert-butylphenyl)ether, bis(p-β-methyl-δ-aminophenyl)benzene, bis-p-(1,1-dimethyl-5-amino-pentyl)benzene, 1-isopropyl-2,4-m-phenylenediamine, m-xylylenediamine, p-xylylenediamine, di(p-aminocyclohexyl)methane, hexamethylenediamine, heptamethylenediamine, octamethylenediamine, nonamethylenediamine, decamethylenediamine, diaminopropyltetramethylene, 3-methylheptamethylenediamine, 4,4-dimethylheptamethylenediamine, 2,11-diaminododecane, 1,2-bis-3-aminoprpoxyethane, 2,2-dimethylpropylenediamine, 3-methoxyhexamethylenediamine, 2,5-dimethylheptamethylenediamine, 3-methylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis[4-(4-aminophenoxy)phenyl]propane, piperazine, $H_2N$ $(CH_2)_3O$ $(CH_2)_2O$ $(CH_2)$ $NH_2$, $H_2N$ $(CH_2)_3S$ $(CH_2)_3NH_2$, and $H_2N$ $(CH_2)_3N$ $(CH_3)_2$ $(CH_2)_3NH_2$.

Polyamide Imide Resin

Examples of the polyamide imide resin include a resin having a repeating unit including an imide linkage and an amide linkage.

Specific examples of the polyamide imide resin include a polymer formed by polymerization of a trivalent carboxylic acid (i.e., tricarboxylic acid) including an acid anhydride group with a diisocyanate or a diamine.

Examples of the tricarboxylic acid include trimellitic anhydride and derivatives thereof. The tricarboxylic acid may be used in combination with a tetracarboxylic dianhydride, an aliphatic dicarboxylic acid, an aromatic dicarboxylic acid, or the like.

Examples of the diisocyanate include 3,3'-dimethylbiphenyl-4,4'-diisocyanate, 2,2'-dimethylbiphenyl-4,4'-diisocyanate, biphenyl-4,4'-diisocyanate, biphenyl-3,3'-diisocyanate, biphenyl-3,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, naphthalene-1,5-diisocyanate, and naphthalene-2,6-diisocyanate.

Examples of the diamine include a compound that has a structure analogous to that of the above-described isocyanate and includes amino groups instead of isocyanato groups.

The content of the first resin in the entire single layer is preferably 60% by mass or more and 95% by mass or less, is more preferably 70% by mass or more and 95% by mass or less, and is further preferably 75% by mass or more and 90% by mass or less in consideration of mechanical strength, the adjustment of volume resistivity, and the like.

The content of the first resin in the entire first layer is preferably 60% by mass or more and 95% by mass or less, is more preferably 70% by mass or more and 95% by mass or less, and is further preferably 75% by mass or more and 90% by mass or less in consideration of mechanical strength, the adjustment of volume resistivity, and the like.

The content of the second resin in the entire second layer is preferably 60% by mass or more and 95% by mass or less, is more preferably 70% by mass or more and 95% by mass or less, and is further preferably 75% by mass or more and 90% by mass or less in consideration of mechanical strength, the adjustment of volume resistivity, and the like.

Conductive Particles

Examples of the first conductive particles included in the single layer or the first layer include particles of carbon black; particles of a metal, such as aluminum or nickel; particles of a metal oxide, such as yttrium oxide or tin oxide; and particles of an ionic conductive substance, such as potassium titanate or lithium chloride (LiCl). Among the above conductive particles, particles of carbon black may be used.

The above types of conductive particles may be used alone or in combination of two or more.

Examples of the carbon black include Ketjenblack, oil furnace black, channel black (i.e., gas black), and acetylene black. The carbon black particles may be carbon black particles the surfaces of which have been treated (hereinafter, such carbon black particles may be referred to as "surface treated carbon black particles").

The surface treated carbon black particles are produced by attaching a carboxyl group, a quinone group, a lactone group, a hydroxyl group, or the like to the surfaces of the carbon black particles. Examples of a method for treating the surfaces of the carbon black particles include an air oxidation method in which carbon black particles are contacted with air in a high temperature atmosphere; a method in which carbon black particles are caused to react with a nitrogen oxide or ozone at normal temperature (e.g., 22° C.); and a method in which carbon black particles are subjected to air oxidation in a high temperature atmosphere and subsequently oxidized with ozone at a low temperature.

Among the above carbon black particles, channel black particles are suitable as conductive particles. In particular, acidic carbon black particles having a pH of 5.0 or less are suitable.

Examples of the acidic carbon black particles include carbon black particles the surfaces of which have been oxidized, such as carbon black particles produced by attaching a carboxyl group, a quinone group, a lactone group, a hydroxyl group, or the like onto the surfaces thereof.

The acidic carbon black particles are preferably carbon black particles having a pH of 4.5 or less, are more preferably acidic carbon black particles having a pH of 4.0 or less, are further preferably acidic carbon black particles having a pH of 3.0 or less, are particularly preferably acidic carbon black particles having a pH of 2.0 or more and 3.0 or less, and are most preferably acidic carbon black particles having a pH of 2.0 or more and 2.8 or less in order to enhance the transferability to rough surface paper.

The pH of acidic carbon black particles is measured by the pH measuring method described in JIS Z8802 (2011).

The number average primary particle size of the first conductive particles is, for example, 20 nm or less. In order to adjust the y/x ratio to fall within the above range, the number average primary particle size of the first conductive particles is preferably 18 nm or less, is more preferably 15 nm or less, and is further preferably 13 nm or less. The number average primary particle size of the first conductive particles is, for example, 2 nm or more. In order to adjust the y/x ratio to fall within the above range, the number average primary particle size of the first conductive particles is preferably 5 nm or more and is more preferably 10 nm or more.

The number average primary particle size of the conductive particles is measured by the following method.

First, a sample having a thickness of 100 nm is taken from each of the layers constituting the belt with a microtome. The sample is observed with a transmission electron microscope (TEM). For each of 50 conductive particles, the diameter of a circle having an area equal to the projected area of the conductive particle, that is, the equivalent circle diameter of the conductive particle, is calculated as the particle size of the conductive particle. The average of the particle sizes of the 50 conductive particles is considered the number average primary particle size of the conductive particles.

The number average secondary particle size of the first conductive particles is, for example, 13 nm or more and 100 nm. In order to adjust the y/x ratio to fall within the above range, the number average secondary particle size of the first conductive particles is preferably 13 nm or more and 55 nm or less and is more preferably 13 nm or more and 40 nm or less.

The number average secondary particle size of the first conductive particles is preferably 1 time or more and 8 times or less, is more preferably 1 time or more and 5 times or less, is further preferably 1 time or more and 4.5 times or less, is particularly preferably 1 time or more and 3.5 times or less, and is most preferably 1 time or more and 3 times or less the number average primary particle size of the first conductive particles in order to adjust the y/x ratio to fall within the above range.

The number average secondary particle size of the conductive particles is determined using an image obtained by observing the outer peripheral surface of the endless belt with a scanning electron microscope, such as "SU8010" produced by Hitachi High-Tech Corporation, at a 20,000-fold magnification and converting the resulting 256-level image into a binary representation with a threshold of 128. Specifically, for each of 50 aggregates and the like of the conductive particles, the diameter of a circle having an area equal to the projected area of the aggregate, that is, the equivalent circle diameter of the aggregate, is calculated. The average of the equivalent circle diameters is considered the number average secondary particle size of the conductive particles.

In the calculation of the number average secondary particle size of conductive particles, when the conductive particles include primary particles that are present alone without forming aggregates, the equivalent circle diameters of the primary particles that are present alone are included in the calculation. In other words, in the case where conductive particles are all present alone without forming aggregates, the number average secondary particle size of the conductive particles is equal to the number average primary particle size of the conductive particles.

The content of the first conductive particles in the entire single layer is preferably 10% by mass or more and 50% by mass or less, is more preferably 12% by mass or more and 40% by mass or less, is further preferably 14% by mass or more and 30% by mass or less, and is particularly preferably 15% by mass or more and 20% by mass or less in order to increase resistivity and dispersibility in the surface.

The content of the first conductive particles in the entire first layer is preferably 10% by mass or more and 50% by mass or less, is more preferably 12% by mass or more and 40% by mass or less, is further preferably 14% by mass or more and 30% by mass or less, and is particularly preferably 15% by mass or more and 20% by mass or less in order to increase resistivity and dispersibility in the surface.

Specific examples of the second conductive particles included in the second layer are the same as the above-described specific examples of the first conductive particles.

The number average primary particle size of the second conductive particles is, for example, 2 nm or more and 40 nm or less. In consideration of dispersibility, mechanical strength, volume resistivity, and the like, the number average primary particle size of the second conductive particles is preferably 20 nm or more and 40 nm or less, is more preferably 20 nm or more and 35 nm or less, and is further preferably 20 nm or more and 28 nm or less.

The content of the second conductive particles in the entire second layer is 5% by mass or more and 40% by mass or less, is more preferably 10% by mass or more and 30% by mass or less, and is further preferably 20% by mass or more and 30% by mass or less in consideration of dispersibility, mechanical strength, and adjustment of volume resistivity.

Other Component

The single layer, the first layer, and the second layer may further include a component other than the above-described resin or the above-described conductive particles.

Examples of the other component include a conductant agent other than the conductive particles; a filler that increases the strength of the belt; an antioxidant that reduces the thermal degradation of the belt; a surfactant that enhances flowability; and a heat aging inhibitor.

In the case where any of the above layers includes the other component, the amount of the other component included in the layer is preferably more than 0% by mass and 10% by mass or less, is more preferably more than 0% by mass and 5% by mass or less, and is further preferably more than 0% by mass and 1% by mass or less of the total amount of the layer.

Properties of Endless Belt

Thickness of Endless Belt

The thickness of the single layer is preferably 60 μm or more and 120 μm or less and is more preferably 80 μm or more and 120 μm or less in consideration of the mechanical strength of the belt.

The thickness of the first layer is preferably 1 μm or more and 40 μm or less and is more preferably 3 μm or more and 20 μm or less in consideration of productivity and reduction in discharge.

The thickness of the second layer is preferably 50 μm or more and 100 μm or less and is more preferably 60 μm or more and 80 μm or less in consideration of the mechanical strength of the belt.

In the case where the endless belt includes the first and second layers, the proportion of the thickness of the first layer to the overall thickness of the endless belt is preferably 3% or more and 50% or less and is more preferably 5% or more and 30% or less in consideration of the transferability to rough surface paper.

The thicknesses of the above layers are measured in the following manner.

Specifically, a cross section of the endless belt in the thickness direction is observed with an optical microscope or a scanning electron microscope. The thickness of each of the layers that are to be measured is measured at ten positions, and the average thereof is considered the thickness of the layer.

Volume Resistivity and Surface Resistivity of Endless Belt

The common logarithm y [log Ω·cm] of the volume resistivity of the single layer or the first layer is preferably 8.2 log Ω·cm or more and 13.0 log Ω·cm or less, is more preferably 8.4 log Ω·cm or more and 12.0 log Ω·cm or less, and is particularly preferably 10.0 log Ω·cm or more and 11.5 log Ω·cm or less in consideration of the transferability to rough surface paper.

The common logarithm x [log Ω/□] of the surface resistivity of the outer peripheral surface of the single layer or the first layer is preferably 9.0 log Ω/□ or more and 13.0 log Ω/□ or less, is more preferably 9.0 log Ω/□ or more and 12.0 log Ω/□ or less, and is particularly preferably 10.5 log Ω/□ or more and 11.5 log Ω/□ or less in consideration of the transferability to rough surface paper.

When the common logarithm of the surface resistivity of the outer peripheral surface falls within the above range, a reduction in the likelihood of electric charge being deposited on the single layer or the first layer and scattering of toner particles may be limited particularly compared with the case where the common logarithm of the surface resistivity of the outer peripheral surface exceeds the above range.

The y/x ratio is 0.8992 or more and 1.0157 or less. In consideration of the transferability to rough surface paper, the y/x ratio is preferably 0.9000 or more and 1.0000 or less, is more preferably 0.9300 or more and 1.0000 or less, and is further preferably 0.9500 or more and 1.0000 or less.

A method for adjusting the y/x ratio to fall within the above range is not limited. Examples of the method include a method in which particles having a small number average primary particle size are used as first conductive particles; a method in which carbon black particles having a low pH are used as first conductive particles; a method in which the type of the first conductive particles used is selected appropriately; a method in which the conditions under which the endless belt is produced (e.g., drying conditions) are adjusted appropriately; and any combination of the above methods.

Method for Producing Endless Belt

A method for producing the endless belt according to the exemplary embodiment is not limited.

An example of the method for producing the endless belt includes preparing a first coating liquid that includes the first resin or a precursor thereof, the first conductive particles, and a first solvent (hereinafter, this step is referred to as "first coating liquid preparing step"); applying the first coating liquid onto the outer periphery of a member to form a first coating film (hereinafter, this step is referred to as "first coating film forming step"); and drying the first coating film while increasing the temperature of the member (hereinafter, this step is referred to as "first drying step"). The method for producing the endless belt may include a step other than the first coating liquid preparing step, the first coating film forming step, or the first drying step. For example, in the case where a precursor of the first resin is used, examples of the other step include baking the first coating film dried in the first drying step (hereinafter, this step is referred to as "first baking step").

In the case where a single-layer endless belt is produced, the single layer including the first resin and the first conductive particles is formed on the outer peripheral surface of the member by conducting the first coating liquid preparing step, the first coating film forming step, and the first drying step. Alternatively, the single layer may be formed by, for example, preparing pellets that include the first resin and the first conductive particles and forming the pellets into a predetermined shape by melt extrusion. The single layer may be produced by repeatedly conducting the first coating film forming step and the first drying step plural times to form plural sublayers as a single body. The number of repetition of the first coating film forming step and the first drying step may be, but is not limited to, two or three or more.

In the case where a multilayer endless belt is produced, the first layer including the first resin and the first conductive particles is formed on the outer peripheral surface of the second layer formed on the member by conducting, for example, the first coating liquid preparing step, the first coating film forming step, and the first drying step. Similarly to the single layer, the first layer may also be produced by repeatedly conducting the first coating film forming step and the first drying step plural times to form plural sublayers as a single body.

In the case where a multilayer endless belt is produced, the second layer is formed on the outer peripheral surface of a member by, for example, preparing a second coating liquid that includes the second resin or a precursor thereof, the second conductive particles, and a second solvent (hereinafter, this step is referred to as "second coating liquid preparing step"); applying the second coating liquid onto the outer periphery of a member to form a second coating film (hereinafter, this step is referred to as "second coating film forming step"); and drying the second coating film (hereinafter, this step is referred to as "second drying step"). Alternatively, the second layer may be formed by, for example, preparing pellets that include the second resin and the second conductive particles and forming the pellets into a predetermined shape by melt extrusion.

Coating Liquid Preparing Step

In the first coating liquid preparing step, a first coating liquid that includes the first resin or a precursor thereof, the first conductive particles, and a first solvent is prepared. For example, in the case where the first resin is a polyimide resin and the first conductive particles are carbon black particles, a solution that includes, for example, carbon black particles dispersed therein, a first solvent, and polyamic acid (i.e., a precursor of a polyimide resin) dissolved in the first solvent is prepared as a first coating liquid. For example, in the case where the first resin is a polyamide imide resin and the first conductive particles are carbon black particles, a solution that includes, for example, carbon black particles dispersed therein, a first solvent, and a polyamide imide resin dissolved in the first solvent is prepared as a first coating liquid.

In the preparation of the first coating liquid, the dispersion treatment may be performed using a pulverizer, such as a ball mill or jet mill, in order to disintegrate aggregates of the first conductive particles and enhance the dispersibility of the first conductive particles.

The first solvent is not limited and may be selected appropriately in accordance with the type, etc. of the resin used as a first resin. For example, in the case where the first resin is a polyimide resin or a polyamide imide resin, the polar solvent described below may be used as a first solvent.

Examples of the polar solvent include N-methyl-2-pyrrolidone (NMP), N,N-dimethylformamide (DMF), N,N-dimethylacetamide (DMAc), N,N-diethylacetamide (DEAc), dimethyl sulfoxide (DMSO), hexamethylphosphoramide (HMPA), N-methylcaprolactam, N-acetyl-2-pyrrolidone, and 1,3-dimethyl-2-imidazolidinone (N,N-dimethylimidazolidinone, DMI). The above polar solvents may be used alone or in combination of two or more.

In the case where the method for producing the endless belt includes the second coating liquid preparing step, in the second coating liquid preparing step, a second coating liquid that includes the second resin, the second conductive particles, and a second solvent is prepared. The second resin and the second conductive particles are as described above.

A method for preparing the second coating liquid and the second solvent are the same as the method for preparing the first coating liquid and the first solvent, respectively.

Coating Film Forming Step

In the first coating film forming step, the first coating liquid is applied onto the outer periphery of a member to form a first coating film.

Examples of the member to which the coating liquid is applied include a hollow cylindrical or solid cylindrical mold. The member may be prepared by treating the outer peripheral surface of the above mold with a release agent. In the case where a single-layer endless belt is produced, in the first coating film forming step, for example, the first coating liquid is directly applied onto the outer peripheral surface of the member or the member treated with a release agent. In the case where a multilayer endless belt is produced, in the first coating film forming step, for example, the first coating liquid is applied to the second layer or onto the outer peripheral surface of the member on which the second coating film is formed.

Examples of a method for applying the first coating liquid include the following known coating methods: spray coating, spiral coating (i.e., flow coating), blade coating, wire bar coating, dip coating, bead coating, air knife coating, and curtain coating.

In the case where the method for producing the endless belt includes the second coating film forming step, in the second coating film forming step, the second coating liquid is applied onto the outer periphery of the member to form a second coating film. A method for applying the second coating liquid is the same as the method for applying the first coating liquid.

Drying Step

In the first drying step, the first coating film formed in the first coating film forming step is dried. The first drying step removes the first solvent included in the first coating film. Consequently, the single layer or the first layer is formed.

Examples of a method for drying the first coating film include a method in which hot air is supplied to the first coating film; and a method in which the member is heated.

The velocity of the hot air on the surface of the first coating film is, for example, 0.1 m/s or more and 50 m/s or less, is preferably 1 m/s or more and 40 m/s or less, and is more preferably 1 m/s or more and 20 m/s or less.

Specifically, the velocity of the hot air on the surface of the first coating film is measured by converting a voltage output from "MONITOR-N" connected to a tape-on wind speed and temperature probe "QB-5" into wind velocity using a conversion formula.

The temperature of the hot air on the surface of the first coating film is, for example, 100° C. or more and 280° C. or less, is preferably 100° C. or more and 250° C. or less, and is more preferably 110° C. or more and 235° C. or less.

The temperature of the hot air on the surface of the first coating film is measured with a thermometer (e.g., a Type K thermocouple "JBS-7115-5M-K" produced by Graphtec Corporation) connected to a data recorder "GL240" produced by Graphtec Corporation.

A method for supplying hot air to the surface of the first coating film is not limited. Examples of the method include a method in which hot air generated in a drying furnace is blown through a slit nozzle against the surface of the first coating film; and a method in which hot air generated in a drying furnace is supplied directly to the first coating film. Among these methods, the method in which a slit nozzle is used may be used in order to increase ease of control of the velocity of the hot air on the surface of the first coating film.

In the case where the method for producing the endless belt includes the second drying step, in the second drying step, the second coating film formed in the second coating film forming step is dried. A method for drying the second coating film is the same as the method for drying the first coating film. The second drying step may be completed prior to the first coating film forming step. Alternatively, the first coating film forming step may be started before the second drying step is completed. In such a case, the first drying step may also serve as part of the second drying step.

Baking Step

As described above, the method for producing the endless belt may include the first baking step. In the first baking step, the first coating film dried in the first drying step is baked by heating. For example, in the case where the first resin is a polyimide resin, the first baking step causes imidization of the polyamic acid included in the first coating film to produce polyimide.

The heating temperature in the first baking step is, for example, 150° C. or more and 450° C. or less and is preferably 200° C. or more and 430° C. or less. The amount of time during which heating is performed in the first baking step is, for example, 20 minutes or more and 180 minutes or less and is preferably 60 minutes or more and 150 minutes or less.

In the case where a multilayer endless belt is produced and the second layer is formed by conducting the second coating liquid preparing step, the second coating film forming step, and the second drying step, the method for producing the endless belt may include a second baking step in which the second coating film dried in the second drying step is baked. The second baking step may also serve as the first baking step.

Transfer Device and Image Forming Apparatus

A transfer device according to the exemplary embodiment includes an intermediate transfer body; a first transfer unit that transfers a toner image formed on the surface of an image holding member onto the surface of the intermediate transfer body as first transfer; and a second transfer unit that transfers the toner image transferred on the surface of the intermediate transfer body onto the surface of a recording medium as second transfer. The intermediate transfer body is the above-described endless belt.

An image forming apparatus according to the exemplary embodiment includes an image holding member; a charging device that charges the surface of the image holding member; an electrostatic-latent image forming device that forms an electrostatic latent image on the charged surface of the image holding member; a developing device that includes a developer including a toner and develops the electrostatic latent image formed on the surface of the image holding member with the developer to form a toner image; and a transfer device that transfers the toner image onto the surface of a recording medium. The transfer device is the above-described transfer device.

An example of the image forming apparatus according to the exemplary embodiment is described below with reference to the attached drawing.

FIGURE is a schematic diagram illustrating the image forming apparatus according to the exemplary embodiment.

The intermediate transfer belt is the above-described endless belt.

A portion of the image forming apparatus according to the exemplary embodiment which includes, for example, at least the transfer device may be a cartridge structure (i.e., process cartridge) detachably attachable to the image forming apparatus.

An image forming apparatus 100 according to the exemplary embodiment is, for example, an intermediate-transfer image forming apparatus illustrated in FIGURE, which is commonly referred to as a tandem image forming apparatus. The image forming apparatus 100 includes plural image forming units 1Y, 1M, 1C, and 1K that form yellow (Y), magenta (M), cyan (C), and black (K) toner images by an electrophotographic system; a first transfer section 10 (i.e., a first transfer region) in which the yellow, magenta, cyan, and black toner images formed by the image forming units 1Y, 1M, 1C, and 1K are sequentially transferred (first transfer) to an intermediate transfer belt 15; a second transfer section 20 (i.e., a second transfer region) in which the superimposed toner images transferred on the intermediate transfer belt 15 are collectively transferred (second transfer) to a paper sheet K, which is an example of the recording medium; and a fixing device 60 that fixes the image transferred on the paper sheet K by second transfer to the paper sheet K. The image forming apparatus 100 also includes a controller 40 that controls the operation of each of the devices and the sections.

Each of the image forming units 1Y, 1M, 1C, and 1K included in the image forming apparatus 100 includes a photosensitive member 11 (an example of the image holding member) that rotates in the direction of the arrow A, which is an example of the image holding member that holds a toner image formed on the surface.

The photosensitive member 11 is provided with a charger 12 (an example of the charging device) and a laser exposure machine 13 (an example of the electrostatic latent image forming device) which are disposed on the periphery of the photosensitive member 11. The charger 12 charges the photosensitive member 11. The laser exposure machine 13 writes an electrostatic latent image on the photosensitive member 11 (in FIGURE, an exposure beam is denoted with Bm).

The photosensitive member 11 is also provided with a developing machine 14 (an example of the developing device) and a first transfer roller 16 which are disposed on the periphery of the photosensitive member 11. The developing machine 14 includes a yellow, magenta, cyan, or black toner and visualizes the electrostatic latent image formed on the photosensitive member 11 with the toner. The first transfer roller 16 transfers the yellow, magenta, cyan, or black toner image formed on the photosensitive member 11 to the intermediate transfer belt 15 in the first transfer section 10.

The photosensitive member 11 is further provided with a photosensitive member cleaner 17 disposed on the periphery of the photosensitive member 11. The photosensitive member cleaner 17 removes toner particles remaining on the photosensitive member 11. The above-described electrophotographic devices, that is, the charger 12, the laser exposure machine 13, the developing machine 14, the first transfer roller 16, and photosensitive member cleaner 17, are sequentially arranged on the periphery of the photosensitive member 11 in the direction of the rotation of the photosensitive member 11. The image forming units 1Y, 1M, 1C, and 1K are arranged in a substantially linear manner in the order of yellow (Y), magenta (M), cyan (C), and black (K) in the direction of the rotation of the intermediate transfer belt 15.

The intermediate transfer belt 15, which serves as an intermediate transfer body, has a volume resistivity of, for example, $1\times10^6$ Ωcm or more and $1\times10^{14}$ Ωcm or less and a thickness of, for example, about 0.1 mm.

The intermediate transfer belt 15 is driven in a circulatory manner (i.e., rotated), by various types of rollers at an intended speed in the direction of the arrow B illustrated in FIGURE. The various types of rollers include a driving roller 31 that is driven by a highly-constant-speed motor (not illustrated) and rotates the intermediate transfer belt 15; a support roller 32 that supports the intermediate transfer belt 15 that extends in a substantially linear manner in the direction in which the photosensitive members 11 are arranged; a tension roller 33 that applies tension to the intermediate transfer belt 15 and serves as a correction roller that prevents meandering of the intermediate transfer belt 15; a backing roller 25 disposed in the second transfer section 20; and a cleaning backing roller 34 disposed on a cleaning section in which toner particles remaining on the intermediate transfer belt 15 are scraped off.

The first transfer section 10 is constituted by first transfer rollers 16 that are arranged to face the respective photosensitive members 11 across the intermediate transfer belt 15. The first transfer rollers 16 are arranged to be in pressure contact with the photosensitive members 11 with the intermediate transfer belt 15 interposed between the first transfer rollers 16 and the photosensitive members 11. The first transfer rollers 16 are supplied with a voltage (first transfer bias) having a polarity opposite to the polarity (negative; the same applies hereinafter) of charged toner particles. Accordingly, toner images formed on the photosensitive members 11 are electrostatically attracted to the intermediate transfer belt 15 sequentially to form superimposed toner images on the intermediate transfer belt 15.

The second transfer section 20 is constituted by the backing roller 25 and a second transfer roller 22 disposed on a side of the intermediate transfer belt 15 on which the toner image is held.

The backing roller 25 has a surface resistivity of $1\times10^7$ $\Omega/\square$ or more and $1\times10^{10}\Omega/\square$ or less. The degree of hardness of the backing roller 25 is set to, for example, 70° ("ASKER C" produced by KOBUNSHI KEIKI CO., LTD.; the same applies hereinafter). The backing roller 25 is disposed on the rear surface-side of the intermediate transfer belt 15 and serves as a counter electrode for the second transfer roller 22. The backing roller 25 is provided with a power supplying roller 26 made of a metal, through which a second transfer bias is applied in a consistent manner.

The second transfer roller 22 is a hollow cylindrical roller having a volume resistivity of $10^{7.5}$ Ωcm or more and $10^{5.5}$ Ωcm or less. The second transfer roller 22 is arranged to be in pressure contact with the backing roller 25 with the intermediate transfer belt 15 interposed between the second transfer roller 22 and the backing roller 25. The second transfer roller 22 is grounded. A second transfer bias is formed between the second transfer roller 22 and the backing roller 25. Accordingly, the toner image is transferred (second transfer) to a paper sheet K transported to the second transfer section 20.

The speed at which the paper sheet K is transported in the second transfer section 20 is, for example, 50 mm/s or more and 60 mm/s or less.

An intermediate transfer belt cleaner 35 is disposed on the intermediate transfer belt 15 at a position downstream of the second transfer section 20 such that the distance between the intermediate transfer belt cleaner 35 and the intermediate transfer belt 15 can be changed. The intermediate transfer belt cleaner 35 removes toner particles and paper dust particles that remain on the intermediate transfer belt 15 subsequent to the second transfer and cleans the surface of the intermediate transfer belt 15.

The intermediate transfer belt 15, the first transfer section 10 (i.e., the first transfer rollers 16), and the second transfer section 20 (i.e., the second transfer roller 22) correspond to examples of the transfer device.

A reference sensor (home position sensor) 42 is disposed upstream of the yellow image forming unit 1Y. The reference sensor (home position sensor) 42 generates a reference signal used as a reference to determine the timings at which images are formed in the image forming units 1Y, 1M, 1C, and 1K. An image density sensor 43 is disposed downstream of the black image forming unit 1K. The image density sensor 43 is used for adjusting image quality. The reference sensor 42 generates the reference signal upon recognizing a mark disposed on the back side of the intermediate transfer belt 15. Upon recognizing the reference signal, the controller 40 sends a command to the image forming units 1Y, 1M, 1C, and 1K. Each of the image forming units 1Y, 1M, 1C, and 1K starts forming an image in accordance with the command.

The image forming apparatus according to the exemplary embodiment further includes the following components as units for transporting paper sheets K: a paper tray 50 that contains paper sheets K; a paper feed roller 51 that draws and transports a paper sheet K stocked in the paper tray 50 at predetermined timings; transport rollers 52 that transport the paper sheet K drawn by the paper feed roller 51; a transport guide 53 with which the paper sheet K transported by the transport rollers 52 is fed into the second transfer section 20; a transport belt 55 that transports the paper sheet K that has been subjected to the second transfer with the second transfer roller 22 to the fixing device 60; and a fixing entrance guide 56 with which the paper sheet K is introduced into the fixing device 60.

A fundamental process for forming an image using the image forming apparatus according to the exemplary embodiment is described below.

In image forming apparatus according to the exemplary embodiment, image data sent from an image reading apparatus (not illustrated), a personal computer (PC, not illustrated), or the like are subjected to image processing using an image processing apparatus (not illustrated) and, subsequently, the image forming units 1Y, 1M, 1C, and 1K form images.

In the image processing apparatus, the input reflectance data are subjected to image processing that includes various types of image editing, such as shading correction, misalignment correction, lightness/color space conversion, gamma correction, frame removal, color editing, and image moving. The image data that have been subjected to the image processing are converted into yellow, magenta, cyan, and black colorant gradation data and sent to the laser exposure machines 13.

In accordance with the colorant gradation data received by each of the laser exposure machines 13, the laser exposure machine 13 irradiates the photosensitive member 11 included in each of the image forming units 1Y, 1M, 1C, and 1K with an exposure beam Bm emitted from a semiconductor laser or the like. After the surface of the photosensitive member 11 of each of the image forming units 1Y, 1M, 1C, and 1K has been charged by the charger 12, the surface of the photosensitive member 11 is scanned by the laser exposure machine 13 and exposed to the beam and, consequently, an electrostatic latent image is formed on the surface of the photosensitive member 11. The electrostatic latent image is developed in each of the image forming units 1Y, 1M, 1C, and 1K as Y, M, C, or K toner image.

The toner images formed on the photosensitive members 11 of the image forming units 1Y, 1M, 1C, and 1K are transferred to the intermediate transfer belt 15 in the first transfer section 10 in which the photosensitive members 11 contact with the intermediate transfer belt 15. Specifically, in the first transfer section 10, the first transfer rollers 16 apply a voltage (first transfer bias) having a polarity opposite to the polarity (negative) of charged toner particles to the base of the intermediate transfer belt 15 and the toner images are sequentially superimposed on the surface of the intermediate transfer belt 15 (first transfer).

After the toner images have been sequentially transferred (first transfer) onto the surface of the intermediate transfer belt 15, the intermediate transfer belt 15 is moved and the toner images are transported to the second transfer section 20. When the toner images are transported to the second transfer section 20, in the transport unit, the paper feed roller 51 starts rotating and feeds a paper sheet K having an intended size from the paper tray 50 in synchronization with the transportation of the toner images to the second transfer section 20. The paper sheet K fed by the paper feed roller 51 is transported by the transport rollers 52 and reaches the second transfer section 20 through the transport guide 53. Before the paper sheet K reaches the second transfer section 20, the feeding of the paper sheet K is temporarily paused and an alignment between the paper sheet K and the toner images is made by an alignment roller (not illustrated) being rotated in synchronization with the movement of the intermediate transfer belt 15 on which the toner images are held. For example, even in the case where the paper sheet K is a paper sheet having surface irregularities, such as an embossed paper sheet, suitable transferability to the paper sheet K may be achieved.

In the second transfer section 20, the second transfer roller 22 is pressed by the backing roller 25 with the intermediate transfer belt 15 interposed between the second transfer roller 22 and the backing roller 25. The paper sheet K transported to the second transfer section 20 at the intended timing becomes inserted between the intermediate transfer belt 15 and the second transfer roller 22. Upon a voltage (second transfer bias) having a polarity that is the same as the polarity (negative) of charged toner particles being applied by the power supplying roller 26, a transfer electric field is generated between the second transfer roller 22 and the backing roller 25. The unfixed toner images held on the intermediate transfer belt 15 are electrostatically transferred to the paper sheet K collectively in the second transfer section 20, which is pressurized by the second transfer roller 22 and the backing roller 25.

The paper sheet K on which the toner images have been electrostatically transferred is subsequently removed from the intermediate transfer belt 15 and immediately transported by the second transfer roller 22 to the transport belt 55, which is disposed downstream of the second transfer roller 22 in the direction in which paper sheets are transported. The transport belt 55 transports the paper sheet K to the fixing device 60 in accordance with the transportation speed optimum for the fixing device 60. The unfixed toner images present on the paper sheet K transported to the fixing device 60 are fixed to the paper sheet K by heat and pressure in the fixing device 60. The paper sheet K on which the fixed image has been formed is transported to a paper eject tray (not illustrated) disposed in an ejecting section of the image forming apparatus.

Toner particles that remain on the intermediate transfer belt 15 after the termination of the transfer to the paper sheet K are transported to the cleaning section due to the rotation of the intermediate transfer belt 15 and removed from the intermediate transfer belt 15 by the cleaning backing roller 34 and the intermediate transfer belt cleaner 35.

The exemplary embodiment is described above. It should be understood that the above-described exemplary embodiment is not restrictive, and many modifications, variations, and improvements may be made to the exemplary embodiment.

EXAMPLES

Examples of the exemplary embodiment of the present disclosure are described below. Note that, the exemplary embodiment of the present disclosure is not limited by Examples below. In the following description, "part" and are all on a mass basis.

Example 1

Preparation of Coating Liquid

Carbon black particles (channel black "FW200" produced by Orion Engineered Carbons) are added to an N-methyl-2-pyrrolidone (NMP) solution of polyamic acid synthesized from 3,3',4,4'-biphenyltetracarboxylic dianhydride and 4,4'-diaminodiphenyl ether (solid content after imidization: 18 mass %) such that the amount of the carbon black particles used is 19.0 parts by mass relative to 100 parts by mass of the solid component of the polyamic acid. The resulting mixture is stirred to form a coating liquid 1, which is a solution of a precursor of polyimide in which carbon black particles are dispersed.

Preparation of Intermediate Transfer Belt

A hollow cylindrical aluminum body having an outside diameter of 278 mm and a length of 600 mm is prepared.

While the cylindrical aluminum body is rotated, the coating liquid 1 is ejected onto the outer surface of the cylindrical aluminum body through a dispenser at a width of 500 mm to form a coating film having a thickness of 80 µm.

While the cylindrical aluminum body on which the coating film is formed is kept horizontal, the coating film is dried by heating at 140° C. for 30 minutes. Subsequently, heating is performed for 120 minutes such that the maximum temperature is 320° C. Hereby, an endless belt is prepared.

The endless belt is cut to a width of 363 mm in the vicinity of the center of the endless belt in the axial direction. Hereby, an intermediate transfer belt 1 is prepared.

Example 2

An intermediate transfer belt 2 is prepared as in Example 1, except that the amount of the carbon black particles used in the preparation of the coating liquid is changed from 19.0 parts by mass to 17.5 parts by mass.

Example 3

An intermediate transfer belt 3 is prepared as in Example 1, except that the amount of the carbon black particles used in the preparation of the coating liquid is changed from 19.0 parts by mass to 20.0 parts by mass.

Example 4

An intermediate transfer belt 4 is prepared as in Example 1, except that 14.0 parts by mass of carbon black particles (channel black "FW285" produced by Orion Engineered Carbons) are used instead of 19.0 parts by mass of the carbon black particles "FW200" in the preparation of the coating liquid.

Example 5

An intermediate transfer belt 5 is prepared as in Example 1, except that 14.0 parts by mass of carbon black particles (channel black "FW182" produced by Orion Engineered Carbons) are used instead of 19.0 parts by mass of the carbon black particles "FW200" in the preparation of the coating liquid.

Example 6

An intermediate transfer belt 6 is prepared as in Example 1, except that the amount of the carbon black particles used in the preparation of the coating liquid is changed from 19.0 parts by mass to 20.1 parts by mass.

Example 7

An intermediate transfer belt 7 is prepared as in Example 1, except that the amount of the carbon black particles used in the preparation of the coating liquid is changed from 19.0 parts by mass to 17.4 parts by mass.

Comparative Example 1

An intermediate transfer belt C1 is prepared as in Example 1, except that 27.5 parts by mass of carbon black particles (channel black "Special Black 4" produced by Orion Engineered Carbons) are used instead of 19.0 parts by mass of the carbon black particles "FW200" in the preparation of the coating liquid.

Measurement of Intermediate Transfer Belts

For each of the intermediate transfer belts, the common logarithm $x$ [log Ω/□] of the surface resistivity of the outer peripheral surface of the intermediate transfer belt and the common logarithm $y$ [log Ω·cm] of the volume resistivity of the intermediate transfer belt are determined by the above-described methods. Table 1 summarizes the results.

Table 1 also summarizes the layer structure of each of the endless belts, the number average primary particle size [nm] of the carbon black particles used, and the pH of the carbon black particles used.

For each of the intermediate transfer belts, the number average secondary particle size R of the conductive particles (i.e., the carbon black particles) used is determined by the above-described method and the ratio R/r of the number average secondary particle size R to the number average primary particle side r of the conductive particles is calculated. Table 1 summarizes the results.

Evaluation of Intermediate Transfer Belts
Evaluation of Transferability to Rough Surface Paper A specific one of the intermediate transfer belts is attached to an intermediate transfer belt included in the image forming apparatus "Iridesse™ Production Press" produced by Fuji Xerox Co., Ltd. This image forming apparatus is used for the image quality evaluation below.

In the image quality evaluation, a black (K) halftone 60% solid image is formed on an embossed paper sheet "LEATHAC 66" (250 gsm). The evaluation standards are as follows. Table 1 summarizes the results.

A: Few white missing dots are present in the recesses present on the paper sheet.

B: White missing dots are present in some of the recesses present on the paper sheet.

C: White missing dots are present in about half of the recesses present on the paper sheet.

C: White missing dots are present in almost all of the recesses present on the paper sheet.

TABLE 1

| | Structure | Primary particle size [nm] | pH | x [logΩ/□] | y [logΩ·cm] | y/x | R/r | Transfer evaluation |
|---|---|---|---|---|---|---|---|---|
| Example 1 | Single | 13 | 2.5 | 10.8 | 10.4 | 0.9630 | 3.1 | A |
| Example 2 | Single | 13 | 2.5 | 13.0 | 12.4 | 0.9538 | 3.2 | A |
| Example 3 | Single | 13 | 2.5 | 9.0 | 8.4 | 0.9333 | 3.2 | A |
| Example 4 | Single | 11 | 3.5 | 10.8 | 10.1 | 0.9352 | 4.0 | A |
| Example 5 | Single | 15 | 2.5 | 10.8 | 9.8 | 0.9074 | 2.5 | C |
| Example 6 | Single | 13 | 2.5 | 8.9 | 8.3 | 0.9326 | 3.0 | B |
| Example 7 | Single | 13 | 2.5 | 13.1 | 12.4 | 0.9466 | 3.0 | B |
| Comparative example 1 | Single | 25 | 3.0 | 10.8 | 9.3 | 0.8611 | 5.0 | D |

The results described in Table 1 confirm that the belts prepared in Examples above are excellent in terms of transferability even when a recording medium having large surface irregularities is used, compared with the belts prepared in Comparative examples above.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An endless belt comprising either:
   a single-layer body consisting of a layer including an imide resin and conductive particles, or
   a multilayer body including the layer as an outermost layer,
   wherein a ratio y/x of the layer is 0.8992 or more and 1.0157 or less,
   where x [log Ω/□] is a common logarithm of a surface resistivity of an outer peripheral surface of the layer, the surface resistivity being measured with a ring probe when a voltage of 100 V is applied to the layer for 3 seconds at a load of 1 kg, and y [log Ω·cm] is a common logarithm of a volume resistivity of the layer, the volume resistivity being measured with a ring probe when a voltage of 100 V is applied to the layer for 5 seconds at a load of 1 kg.

2. The endless belt according to claim 1, wherein the conductive particles have a number average primary particle size of 10 nm or more and 20 nm or less.

3. The endless belt according to claim 2, wherein the conductive particles have a number average primary particle size of 10 nm or more and 15 nm or less.

4. The endless belt according to claim 1, wherein the conductive particles include carbon black particles having a pH of 2.0 or more and 3.0 or less.

5. The endless belt according to claim 2, wherein the conductive particles include carbon black particles having a pH of 2.0 or more and 3.0 or less.

6. The endless belt according to claim 3, wherein the conductive particles include carbon black particles having a pH of 2.0 or more and 3.0 or less.

7. The endless belt according to claim 4, wherein the carbon black particles include channel black particles.

8. The endless belt according to claim 5, wherein the carbon black particles include channel black particles.

9. The endless belt according to claim 6, wherein the carbon black particles include channel black particles.

10. The endless belt according to claim 1, wherein the x is 9.0 or more and 13.0 or less.

11. The endless belt according to claim 2, wherein the x is 9.0 or more and 13.0 or less.

12. The endless belt according to claim 3, wherein the x is 9.0 or more and 13.0 or less.

13. The endless belt according to claim 1, wherein the y is 8.2 or more and 13.0 or less.

14. The endless belt according to claim 2, wherein the y is 8.2 or more and 13.0 or less.

15. The endless belt according to claim 3, wherein the y is 8.2 or more and 13.0 or less.

16. The endless belt according to claim 1, wherein the imide resin includes a polyimide resin.

17. The endless belt according to claim 1, wherein the conductive particles have a number average secondary particle size 1 time or more and 8 times or less a number average primary particle size of the conductive particles.

18. The endless belt according to claim 1, comprising the single-layer body.

19. A transfer device comprising:
an intermediate transfer body that is the endless belt according to claim 1;
a first transfer unit that transfers a toner image formed on a surface of an image holding member onto a surface of the intermediate transfer body as first transfer; and
a second transfer unit that transfers the toner image transferred on the surface of the intermediate transfer body onto a surface of a recording medium as second transfer.

20. An image forming apparatus comprising:
an image holding member;
a charging device that charges a surface of the image holding member;
an electrostatic latent image forming device that forms an electrostatic latent image on the surface of the image holding member;
a developing device that includes a developer including a toner and develops the electrostatic latent image formed on the surface of the image holding member with the developer to form a toner image; and
a transfer device that transfers the toner image onto a surface of a recording medium, the transfer device being the transfer device according to claim 19.

* * * * *